US010345589B1

(12) United States Patent
Son

(10) Patent No.: US 10,345,589 B1
(45) Date of Patent: Jul. 9, 2019

(54) COMPACT NEAR-EYE HOLOGRAM DISPLAY

(71) Applicant: Google Inc., Mountain View, CA (US)

(72) Inventor: Hui Son, San Jose, CA (US)

(73) Assignee: GOOGLE LLC, Mountain View, CA (US)

(*) Notice: Subject to any disclaimer, the term of this patent is extended or adjusted under 35 U.S.C. 154(b) by 978 days.

(21) Appl. No.: 14/755,360

(22) Filed: Jun. 30, 2015

(51) Int. Cl.
*G03H 1/00* (2006.01)
*G02B 27/01* (2006.01)

(52) U.S. Cl.
CPC .. *G02B 27/0172* (2013.01); *G02B 2027/0174* (2013.01)

(58) Field of Classification Search
CPC .............. G02B 27/017; G02B 27/0172; G02B 27/0174; G02B 27/2228; G02B 26/004; G02B 2027/0127; G02B 2027/0132; G02B 2027/0134; G02B 2027/014; G02B 2027/0145; G02B 2027/0147; G02B 2027/0187; G02B 5/32; G03H 1/2286; G03H 1/30; G03H 1/2202; G03H 1/26; G03H 1/00; G03H 1/22; G03H 1/0005; G03H 1/0252; G03H 1/0272; G03H 1/2205; G03H 2001/2231; G03H 2001/2234; G03H 2001/16; G03H 2001/18; G03H 2001/306; G03H 2250/00; G03H 2250/42; G03H 2270/00; G03H 2270/55; G03H 2222/18; G03H 2223/16; H04N 13/044; H04N 13/0484; G06T 19/006; G06T 16/00; G06F 3/016

USPC ...................................................... 359/13, 15
See application file for complete search history.

(56) References Cited

U.S. PATENT DOCUMENTS

| 6,181,394 | B1* | 1/2001 | Sanelle ............. G02F 1/133502 349/122 |
| 6,583,938 | B1* | 6/2003 | Woodgate .......... G02B 27/1086 348/E9.027 |
| 8,730,129 | B2 | 5/2014 | Solomon |
| 8,885,112 | B2 | 11/2014 | Popovich et al. |
| 8,964,298 | B2 | 2/2015 | Haddick et al. |
| 9,722,145 | B2* | 8/2017 | Sasaki ................... H01L 33/483 |
| 9,810,910 | B1* | 11/2017 | Park .................... G02B 27/0172 |
| 2006/0061846 | A1* | 3/2006 | Sprague ............. G02B 26/0816 359/204.1 |
| 2010/0149073 | A1 | 6/2010 | Chaum et al. |
| 2014/0043320 | A1 | 2/2014 | Tosaya et al. |

(Continued)

OTHER PUBLICATIONS

Cakmakci, Ozan et al., "Head-Worn Displays: A Review", Journal of Display Technology, vol. 2, No. 3, Sep. 2006, IEEE, pp. 199-216.

(Continued)

*Primary Examiner* — Stephone B Allen
*Assistant Examiner* — Jyotsna V Dabbi

(57) ABSTRACT

An apparatus includes a holographic film having one or more reflective holograms recorded therein. One or more light sources positioned to direct light toward a corresponding one of the one or more holograms, and a dynamic mask positioned between the one or more light sources and the holographic film to spatially modulate light traveling between the one or more light sources and the one or more reflective holograms but not spatially modulate ambient light traveling through the hologram.

20 Claims, 8 Drawing Sheets

(56) References Cited

U.S. PATENT DOCUMENTS

2015/0131047 A1* 5/2015 Saylor ............... G02C 7/12
351/44
2015/0219899 A1* 8/2015 MacK ............... G02B 27/0172
345/633

OTHER PUBLICATIONS

Mukawa, Hiroshi et al., "8.4: Distinguished Paper: A Full Color Eyewear Display Using Holographic Planar Waveguides", Information Technology Laboratories, Sony Corporation, Tokyo, Japan, SID Digest 2008, pp. 89-92.

Lanman, Douglas et al., "Near-Eye Light Field Displays", NVIDIA Research, 10 pages.

Zeiss, Carl, "See Through HMD Lab Prototype", Wear it at Work, http://www.wearitatwork.com/available-technologies-and-their-use-in-wearitwork-project/hardware/io-devices/carl-zeiss-see-throught-hmd/, 2 pages.

Tremblay, Eric et al., Composyt Light Labs: Bringing Together the Virtual and the Real, Lausanne, Switzerland, Jan. 20, 2015, http://www.composyt.com, 1 page.

Lumus—Consumer Market Products, Lumus: A Vision Ahead, http://www.lumus.com-optical.com/index.php?option=com_content&task=view&id=9&Itemid=15, 8 pages.

\* cited by examiner

COMPACT NEAR-EYE HOLOGRAM DISPLAY

TECHNICAL FIELD

The described embodiments relate generally to near-eye displays and in particular, but not exclusively, to compact near-eye displays including holograms.

BACKGROUND

An average human eye can accommodate its focus within an object distance range of 7 cm to infinity—an average human eye, in other words, has difficulty focusing well on objects less than 7 cm away. Ideally, the object distance ranges from a couple of meters to infinity to prevent eye strain during prolonged viewing. Head mounted displays (HMDs) have thus been traditionally designed to project the image from an electronic display, such as a liquid crystal display (LCD) or an array of light emitting diodes (LED), through a lens and into the eye such that the image of the display is virtually projected at a distance far greater than the physical display distance. This prevents the HMD from being huge and ungainly.

Using this technique traditional HMD designs involve the use of a display, a collimator, and a method of relaying this collimated image into the eye, such as a waveguide. Some designs combine the collimator and the relay into one optical component, which can greatly simplify the design. But encapsulation of such designs into an eyeglass lens is often difficult because of size, geometry, and see-through constraints. In the interest of having a discreet HMD design, it would be ideal if an image could be projected into the eye without the use of bulky optics and micro-displays, while at the same time being see through and able to be encapsulated in the lens.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION OF THE ILLUSTRATED EMBODIMENTS

Embodiments are described of an apparatus, system and method for compact near-eye displays including holograms. Specific details are described to provide an understanding of the embodiments, but one skilled in the relevant art will recognize that the invention can be practiced without one or more of the described details or with other methods, components, materials, etc. In some instances well-known structures, materials, or operations are not shown or described in detail but are nonetheless encompassed within the scope of the invention.

Reference in the description to "one embodiment" or "an embodiment" means that a described feature, structure, or characteristic can be included in at least one described embodiment, but appearances of "in one embodiment" or "in an embodiment" do not necessarily all refer to the same embodiment. Furthermore, the described features, structures, or characteristics can be combined in any suitable manner in one or more embodiments.

Figure 1A:
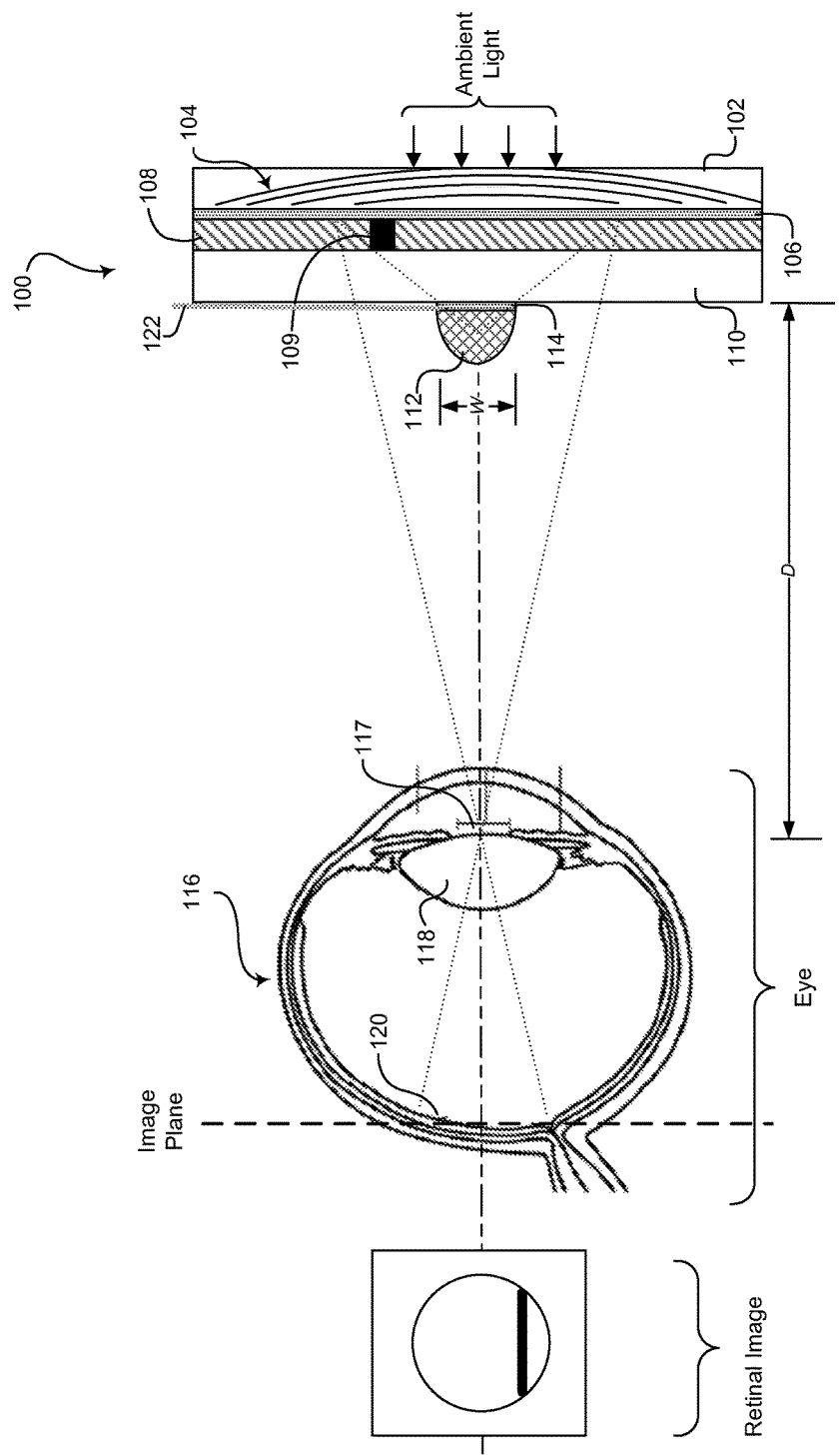
FIGS. 1A-1B are, respectively, cross-sectional and front views of an embodiment of a near-eye holographic display.
Figure 1B:
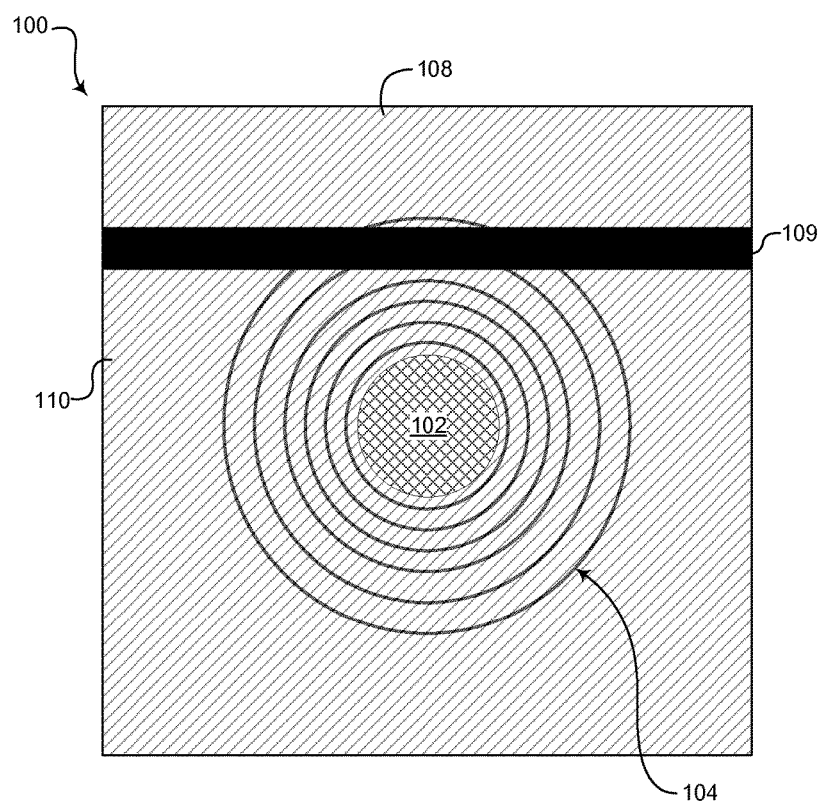

FIG. 1A illustrates an embodiment of a near-eye display 100. Display 100 includes a holographic film 102 having a reflective hologram 104 recorded therein. Polarizer 106 is positioned on a surface of holographic film 102, and a dynamic mask 108 is positioned on polarizer 106 so the polarizer is sandwiched between the dynamic mask and the holographic film. The dynamic mask is a mask that can let ambient light pass through unimpeded while dynamically changing the masking of reflective hologram 104 with respect to light incident from light source 112, for instance by selectively darkening or lightening elements within the dynamic mask such as pixels 109, to selectively and dynamically shield parts of reflective hologram 104 from incident light. In other words, dynamic mask 108 spatially modulates light originating from light source 112 before it is reflected by reflective hologram 104. But, as described below, it does not spatially modulate ambient light that travels from the outside scene through the near-eye display to the eye.

A transparent spacer 110 is positioned on dynamic mask 108 so that dynamic mask 108 is sandwiched between spacer 110 and polarizer 106. Light source 112 is positioned on spacer 110 and oriented to direct light toward reflective hologram 104 so that light emitted by light source 112 will be incident on reflective hologram 104 after passing through other elements such as spacer 110, dynamic mask 108, and polarizers 114 and 106. An additional polarizer 114 is sandwiched between spacer 110 and light source 112 so that light emitted by light source 112 can be immediately polarized upon emission.

Figure 2A:
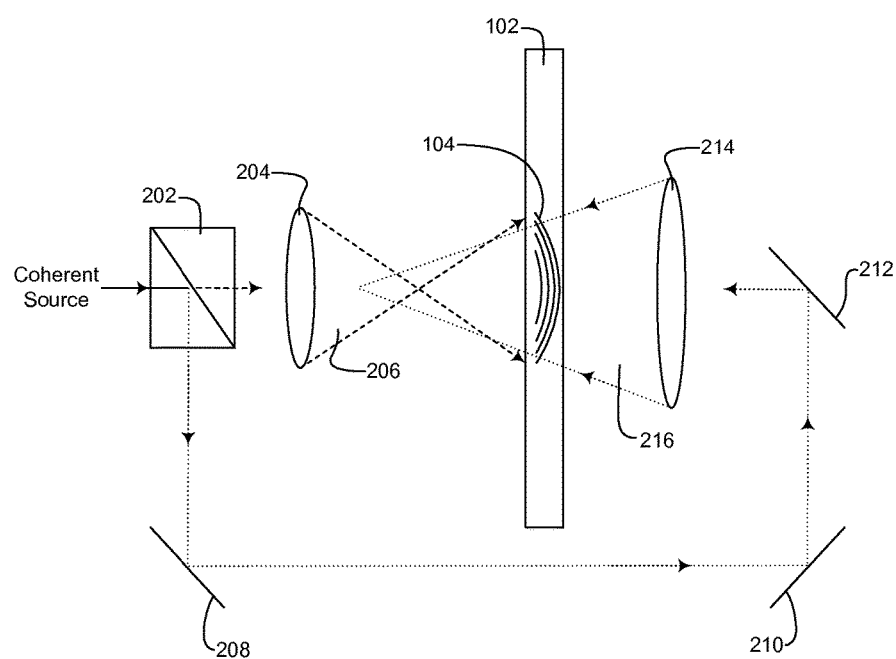
FIGS. 2A-2C are drawings on an embodiment of a process for making a near-eye holographic display such as the one shown in FIGS. 1A-1B.

Holographic film 102 is a recording medium that converts an interference pattern into an optical element that can modify either the amplitude or the phase of incident light according to the intensity of the interference pattern. Holographic film 102 can, in various embodiments, be photographic emulsion, dichromate, gelatin, photoresist, photothermoplastics, photopolymer, or photorefractive material. Reflective hologram 104 is the optical element itself, formed in holographic film 102 as shown in FIG. 2A. Hologram 104 is reflective, meaning that it reflects incident light from light source 112 back in the general direction of the light source.

Polarizers 106 and 114 can be made with any kind of thin polarization film. The particular orientation of polarizers 106 and 104 and their degree of polarization will depend in part on the nature of the light emitted by light source 112. In one embodiment polarizers 106 and 114 can have the same orientation and the same degree of polarization, but in other embodiments one or both of the orientation and the degree of polarization can be different between the two polarizers 106 and 114.

Dynamic mask 108 is a mask that selectively lightens or darkens areas within itself to pass or block incident light originating from light source 112 from reaching reflective hologram 104 while not modulating ambient light passing through the dynamic mask. In the illustrated embodiment dynamic mask 108 can be a transmissive polarization-based display such as a liquid crystal display (LCD) that includes an array of cells or pixels that can be individually lightened or darkened based on an applied control signal. The illustrated embodiment illustrates a darkened line of pixels 109, but in other embodiments pixels in dynamic mask 108 can be selectively darkened or lightened in other patterns to create changing static images or moving images of text characters, images, and other information. In other embodiments, of course, dynamic mask 108 can be some other kind of transmissive display besides a liquid crystal display.

Spacer 100 has a substantially uniform thickness and is put on one side of dynamic mask 108. Among other things, spacer 100 provides appropriate spacing between light source 112 and hologram 104 so that light source 112 is substantially at the focal point of the reflective hologram. Spacer 100 can be made of an optically transparent material such as glass, polycarbonate, and so on.

Light source 112 can be any kind of light source with a transverse dimension W small enough that eye 116 will be unable to see it when display 100 is placed at a distance D closer to the eye than the eye's accommodation distance. In the illustrated embodiment light source 112 is a light emitting diode (LED), in particular a micro-LED. In one micro-LED embodiment, light source 112 can have a transverse dimension W less than 50μ, but in other micro-LED embodiments transverse dimension W can be 30μ or smaller. In one embodiment, performance of display 100 is enhanced if light source 112 emits light at a wavelength near to, or substantially the same as, the wavelength used to record reflective hologram 104 in holographic film 102 (see, e.g., FIG. 2A).

Light source 112 is attached to polarizer 114 by an optically transparent adhesive, and polarizer 114 is similarly attached to spacer 110 by an optically transparent adhesive. Light source 112 can be electrically coupled to a power source via electrode or lead 122. In one embodiment lead 122 can be a transparent lead, such as indium tin oxide, but in other embodiments lead 122 can be a thin visible wire, such as copper, that despite being visible will be unseen by eye 116 if placed closer to the eye than the eye's accommodation distance.

In operation of display 100, light source 112 emits light that travels through polarizer 114 and spacer 110 to reach dynamic mask 108. Dynamic mask 108 has a dynamically changeable pattern of light and dark pixels; in the illustrated embodiment the pattern is a horizontal line of pixels 109, but of course different and more complex patterns are possible and the patterns can be static or changing. Moreover, because mask 108 is dynamic the pattern of light and dark pixels in mask 108 can change at a frequency that allows it to quickly change static images or to create moving images. Darkened pixels in dynamic mask 108 block light originating at light source 112 from reaching reflective hologram 104, while light pixels (i.e., non-darkened pixels or less-darkened pixels) allow light to go through and reach reflective hologram 104.

After passing through dynamic mask 108, light that makes it past the dynamic mask passes through second polarizer 106 and into holographic film 102, where it encounters reflective hologram 104. Reflective hologram 104 reflects the incident light back through polarizer 106 and spacer 110 to pupil 117 of eye 116. Within eye 116, light reflecting off hologram 104 is focused to a point inside the clear aperture of the pupil and thus behaves as a pinhole camera, taking the light received from display 100 and projecting an image onto the eye's retina 120. At any given time, the retinal image on retina 120 substantially corresponds to an image of the configuration of dark and light pixels in dynamic mask 108. Simultaneously with the image being formed on retina 120 by hologram 104, ambient light travels through display 100 and into eye 116 without being spatially modulated by dynamic mask 108 such that the eye can simultaneously see the surrounding scene as well as the information displayed by dynamic mask 108.

Figure 1C:
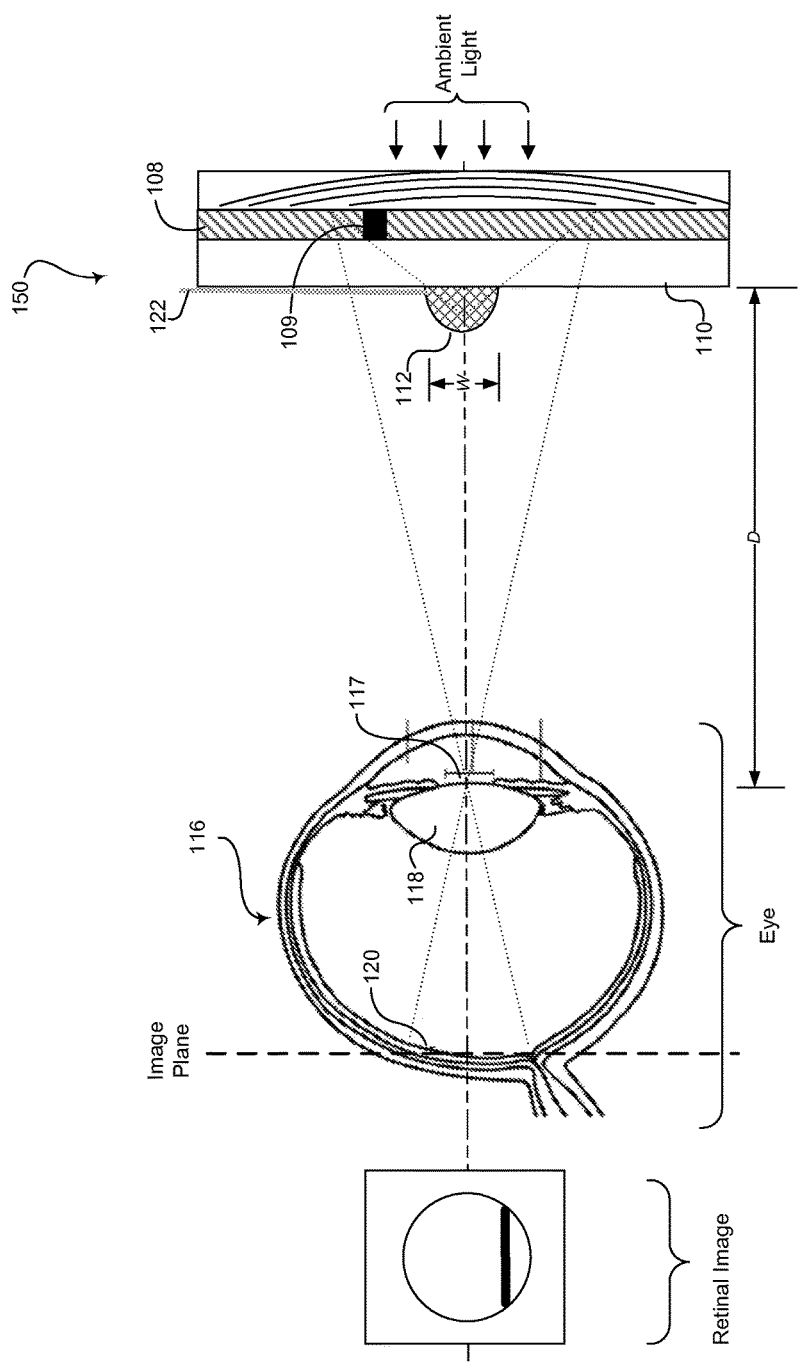
FIG. 1C is a cross-sectional view of another embodiment of a near-eye holographic display.

FIG. 1C illustrates an alternative embodiment of a near-eye display 150. Display 150 is similar in most respects to display 100. The primary difference between displays 150 and 100 is that display 150 omits polarizers 106 and 114. In an embodiment where dynamic mask 108 is not a polarization-based display such as a liquid crystal display, the light from light source 112 need not be polarized to be modulated by the dynamic mask and, as a result, polarizers 106 and 114 can be omitted.

Figure 2B:
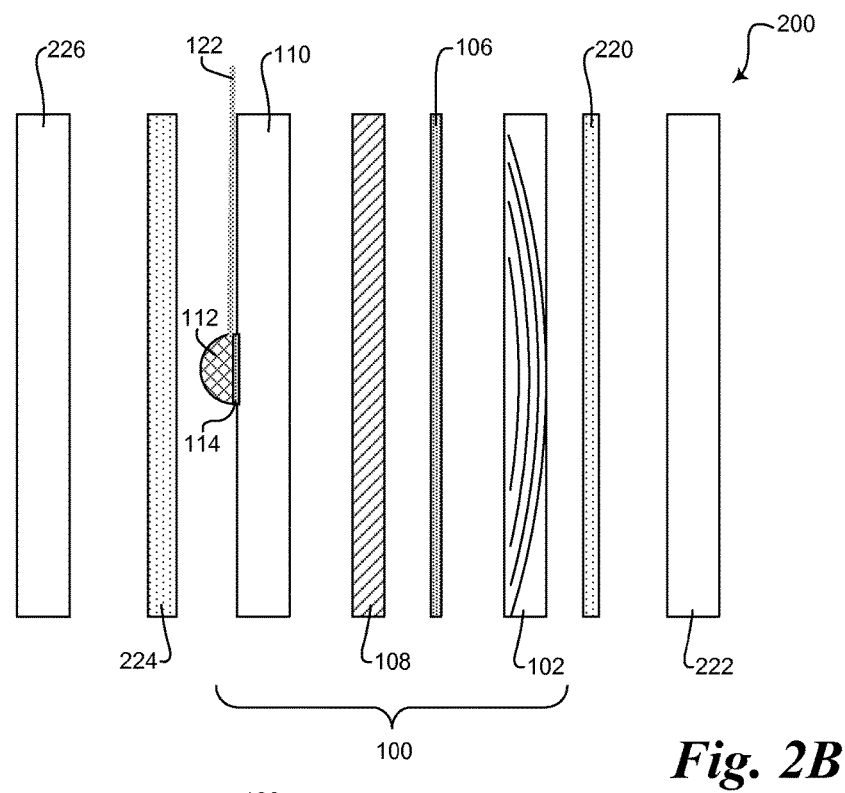
Figure 2C:
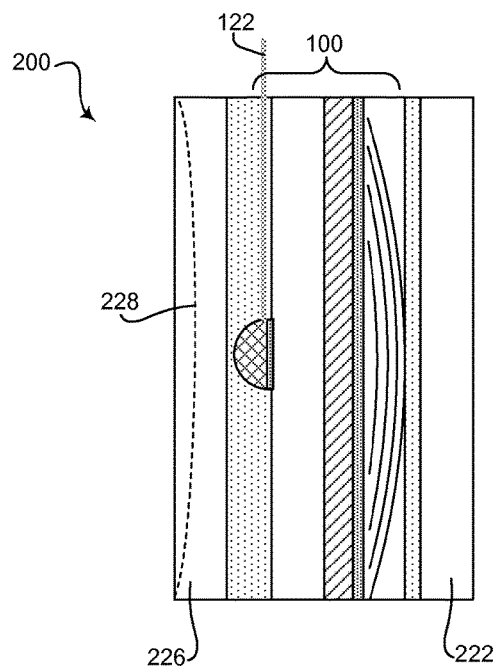

FIGS. 2A-2C illustrate a process for manufacturing an encapsulated near eye display 200 that incorporates near eye display 100. FIG. 2A illustrates an embodiment of a process for forming reflective hologram 104. Holographic film 102 is set up to receive light from both sides. Light from a coherent source such as a laser is directed into a beam splitter 202, which splits the incoming beam into first and second beams. The first beam emerging from beam splitter 202, referred to as the reference beam, is directed through lens 204 to form a focused beam 206 that is projected onto one side of holographic film 102. The second beam emerging from beam splitter 202, referred to as the object beam, is directed to mirrors 208, 210, and 212, which redirect the second beam until it is incident on the opposite side of holographic film 102. Mirror 212 directs the second beam through lens 214 to form a focused beam 216 that is projected onto holographic film 102. Interference between focused beams 206 and 216 then forms reflective hologram 104 in holographic film 102.

FIGS. 2B-2C illustrate an embodiment of an encapsulated near eye display 200; FIG. 2B shows it in disassembled form, FIG. 2C in assembled form. To begin with, a display such as display 100 or display 150 is formed by assembling the holographic film, the spacer, the dynamic mask, the light source and, if applicable, the polarizers. Once display 100 is formed it can then optionally be encapsulated within one or more ophthalmic blanks to help strengthen the display, protect it from environmental damage, and optionally alter its optical characteristics.

In the illustrated embodiment encapsulated near eye display 200 is formed by encapsulating display 100 within two ophthalmic blanks 222 and 226. Ophthalmic blank 222 is attached to holographic film 102 on the side opposite polarizer 106, for instance with a layer of optically transparent adhesive 220. Similarly, ophthalmic blank 226 is attached to spacer 110 by layer of optically transparent adhesive 224. In the illustrated embodiment one or both ophthalmic blanks 222 and 226 are planar, but in other embodiments one or both ophthalmic blanks can be non-planar so that they have optical power. For instance, one surface of ophthalmic blank 226 can be ground to curved shape 228 to provide optical power. Other embodiments of display 200 also need not use planar ophthalmic blanks but can instead use spherical or otherwise curved ophthalmic blanks.

Figure 3:
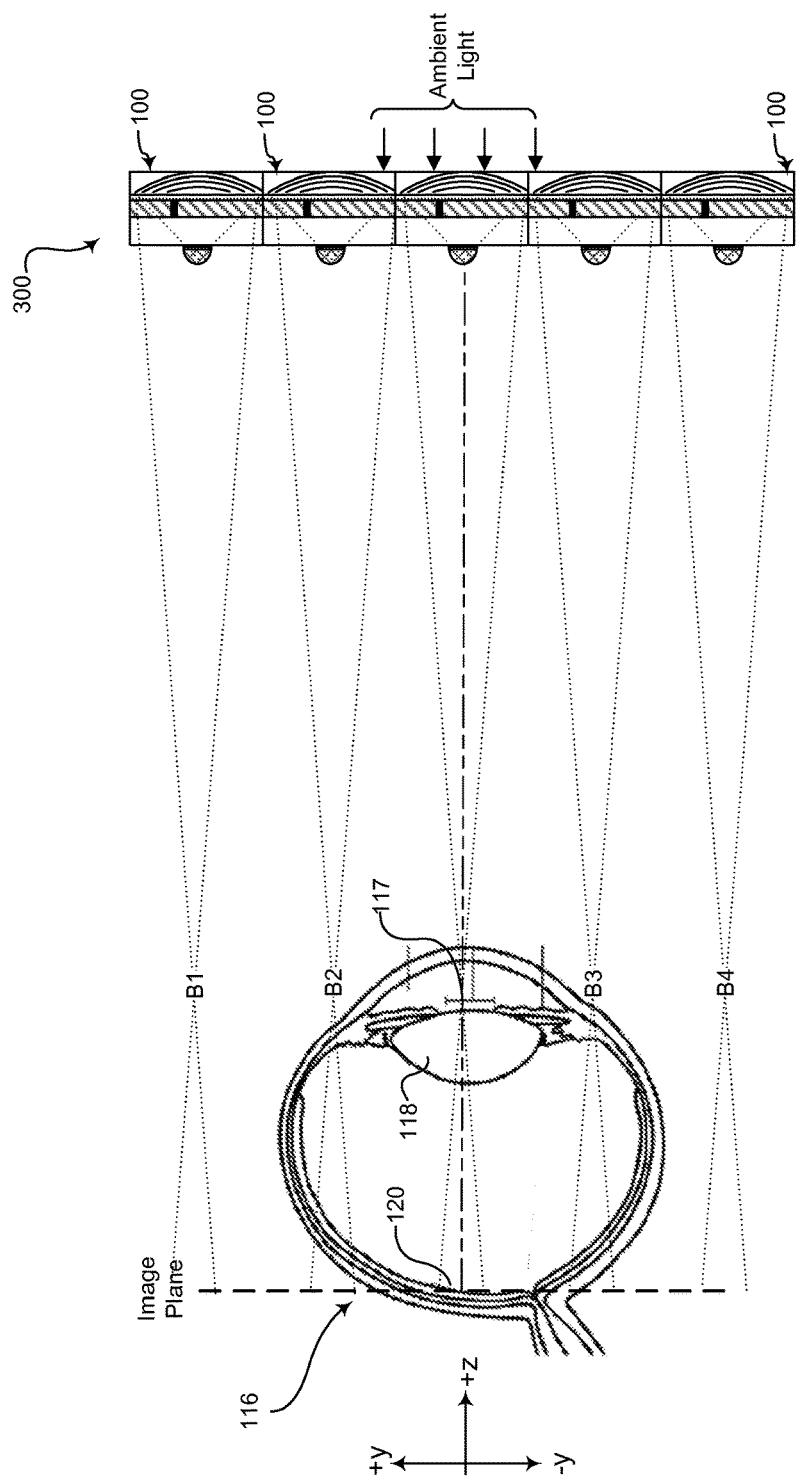
FIG. 3 is a cross-sectional view of another embodiment of a near-eye holographic display.

FIG. 3 illustrates an embodiment of a near eye display 300. Display 300 includes a plurality of near eye displays 100 abutting each other. In display 300 the dynamic mask of every display 100 can project the same image as the other dynamic masks onto its corresponding reflective hologram 104, creating a kind of "multiplexed" display. The illustrated embodiment shows multiple displays 100 abutting in the y direction, but other embodiments can have multiple displays abutting each other in the x direction (into and out of the page), and still other embodiments can have multiple abutting displays in both the x and y directions (see, e.g., FIG. 4B).

An advantage of display 300 is that it produces a bigger eye box. In display 100, if pupil 117 moves away from the focal point of reflective hologram 104, the display becomes invisible to the eye. But display 300 has multiple displays 100, so that if pupil 117 shifts up (in the +y direction) or down (in the −y direction), it will quickly encounter the focal point of another display 100 and will again be able to see the image from dynamic mask 108 of the relevant display 100. For instance, if eye 116 moves from the centerline of display 300 in the +y direction it will quickly encounter focal points B1 and B2, and if pupil 117 moves in the −y direction it will quickly encounter focal points B3 and B4.

Figure 4A:
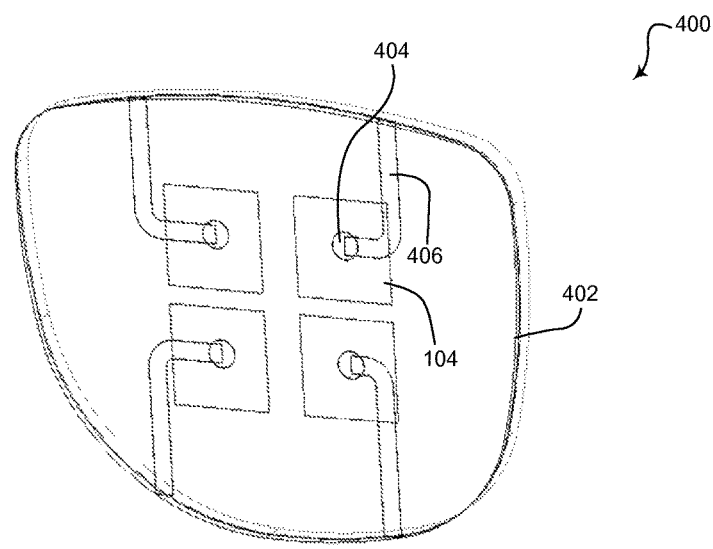
FIGS. 4A-4B are perspective views of an embodiment of a near-eye holographic display incorporated into a lens and eyeglass frames to form an embodiment of a head-mounted display.

FIG. 4A illustrates an embodiment of an eyeglass lens 400 incorporating a near eye display such as display 300. Eyeglass lens 400 consist of a buildup 402 that includes, among other things, holographic film 102, one or more reflective holograms 104, polarizers 106 and 114, dynamic mask 108, and spacer 110. In the illustrated embodiment four individual displays 100 are positioned within buildup 402 so that there are four reflective holograms each with its own light source 404. Each light source 404 is connected coupled via leads or electrodes 406 to a power source.

Figure 4B:
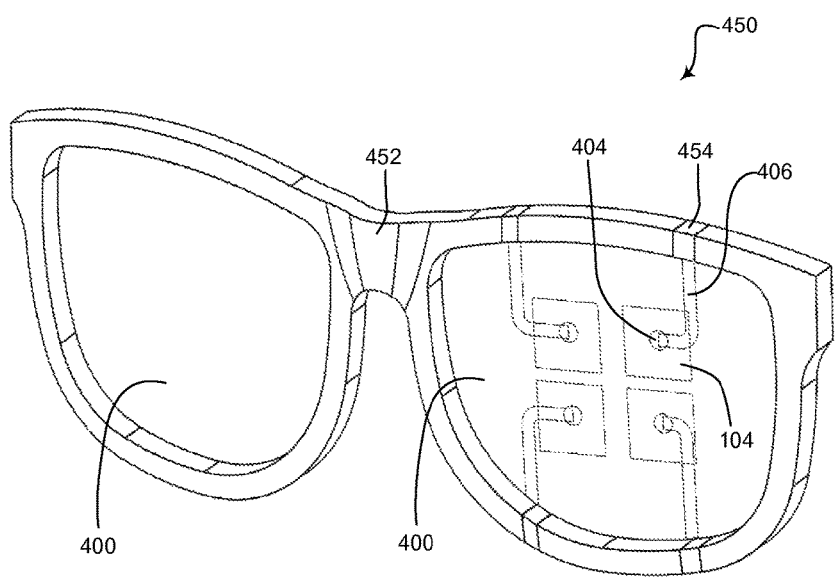

FIG. 4B illustrates a pair of eyeglasses 450 that includes a pair of eyeglass lenses 400. A pair of lenses 400 are put in a frame 452 that can be secured on a user's head, and leads or electrodes 406 from each lens 400 are electrically coupled to contacts 454 on frame 452. Although not shown in the figure, the dynamic mask associated with each light source 404 will be coupled to a data source on or off frames 452, such as a computer including a processor, memory, communication hardware, wireless communication hardware, etc. Coupling the dynamic masks to a data source can be accomplished with leads 406 or other leads not shown.

Figure 5:
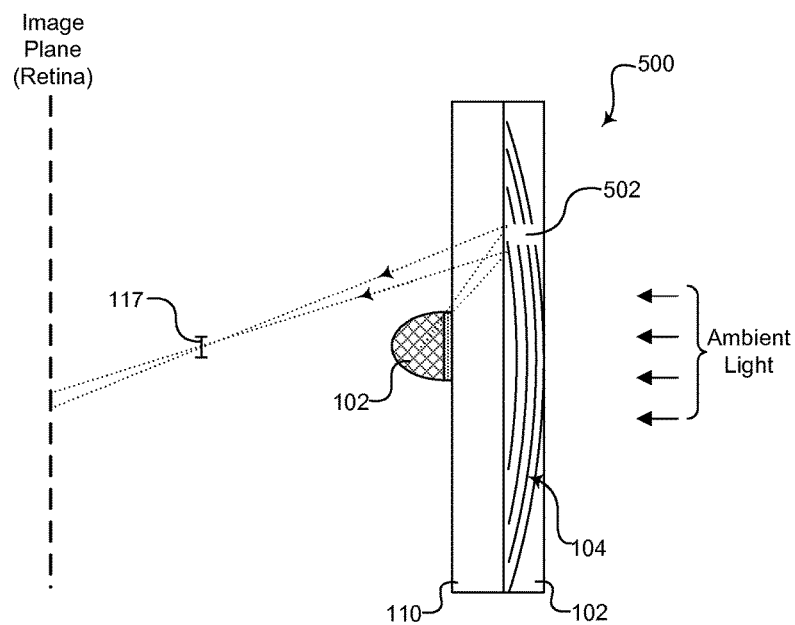
FIG. 5 is a cross-sectional view of another embodiment of a near-eye holographic display.

FIG. 5 illustrates an embodiment of a near eye display 500. Display 500 is similar in most respects to display 100. The primary difference between displays 100 and 500 is that near eye display 500 omits dynamic mask 108 and includes a static holographic image 502. Static mask 502 can be patterned directly into reflective hologram 104, for instance by appropriately masking one of the recording beam during recording of reflective hologram 104 in holographic film 102 (see FIG. 2A). Masked areas of reflective hologram 104 do not reflect light, but instead let it pass through; this effectively superimposes the masked image onto the light that is reflected back toward pupil 117.

Figure 6:
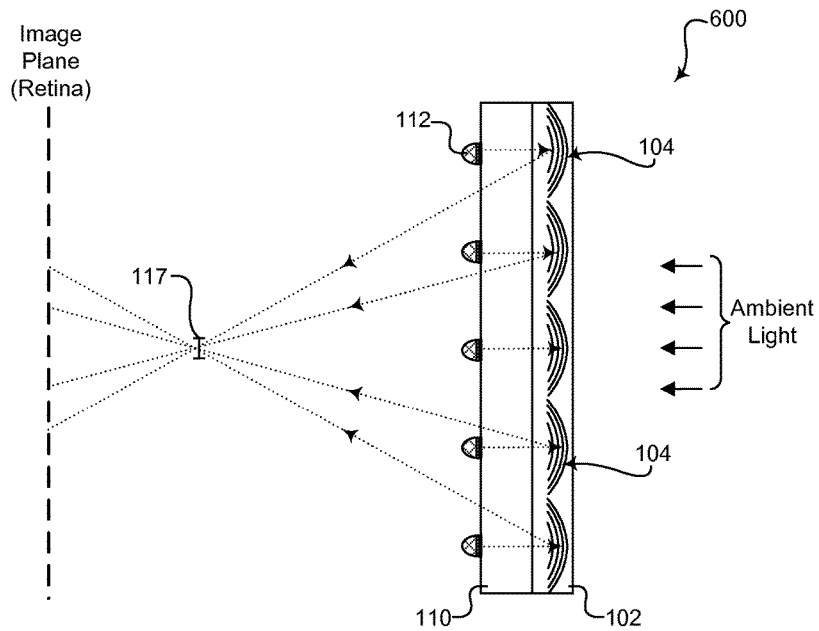
FIG. 6 is a cross-sectional view of another embodiment of a near-eye holographic display.

FIG. 6 illustrates an embodiment of a near eye display 600. Display 600 is similar in most respects to display 100. The primary difference between displays 600 and 100 is that display 600 replaces the functionality of dynamic mask 108 with an array of light source/hologram pairs, in which each pair acts like a pixel on display 100. The result is an image created by the configuration of the array of holograms, rather than the patterning of a single hologram. The array of reflective holograms 104 can written into holographic film 102, for instance by appropriately directing the reference beam through an array of microlenses during recording of the hologram array in the holographic film 102.

The above description of embodiments, including what is described in the abstract, is not intended to be exhaustive or to limit the invention to the described forms. Specific embodiments of, and examples for, the invention are described herein for illustrative purposes, but various equivalent modifications are possible within the scope of the invention in light of the above detailed description, as those skilled in the relevant art will recognize.

The terms used in the following claims should not be interpreted to limit the invention to the specific embodiments disclosed in the specification and the claims. Rather, the scope of the invention is to be determined entirely by the following claims, which are to be interpreted using established claim interpretation doctrines.

The invention claimed is:

1. An apparatus comprising:
   an ophthalmic lens having an eye-facing side and an opposing world-facing side;
   a holographic film disposed at the ophthalmic lens and having one or more reflective holograms recorded therein;
   one or more light sources disposed at the eye-facing side of the ophthalmic lens and positioned to direct light toward a corresponding one of the one or more holograms; and
   a dynamic mask positioned between the one or more light sources and the holographic film, wherein the dynamic mask spatially modulates light traveling between the one or more light sources and the one or more reflective holograms but does not spatially modulate ambient light traveling through the hologram from the world-facing side of the ophthalmic lens.

2. The apparatus of claim 1, further comprising:
   a first polarizer positioned between each of the one or more light sources and its corresponding hologram such that light emitted from each of the one or more light sources passes through the first polarizer; and
   a second polarizer positioned between the dynamic mask and the holographic film such that light incident on the reflective hologram, light reflected by the reflective hologram, and ambient light pass through the second polarizer.

3. The apparatus of claim 1, further comprising a transparent plate positioned between the one or more light sources and the dynamic mask.

4. The apparatus of claim 3 wherein the holographic film, the one or more light sources, the transparent plate, and the dynamic mask are positioned between a pair of ophthalmic blanks of the ophthalmic lens.

5. The apparatus of claim 4 wherein the ophthalmic blanks are attached to the holographic film and the dynamic mask by optically transparent adhesive.

6. The apparatus of claim 4 wherein one or more of the ophthalmic blanks has a surface shaped to provide optical power.

7. The apparatus of claim 1 wherein the one or more light sources comprise light-emitting diodes (LEDs).

8. The apparatus of claim 7 wherein the light-emitting diodes are micro-LEDs having a transverse dimension of less than 50 microns.

9. The apparatus of claim 8 wherein the reflective hologram focuses substantially at an expected position of a pupil of a user's eye.

10. The apparatus of claim 1 wherein the dynamic mask is a liquid crystal display (LCD).

11. An apparatus comprising:
a frame to hold one or more near-eye displays at a distance from a corresponding eye of a user;
one or more near-eye displays positioned in the frame, each near-eye display including:
   an ophthalmic lens having an eye-facing side and an opposing world-facing side;
   a holographic film disposed at the ophthalmic lens and having one or more reflective holograms recorded therein;
   one or more light sources disposed at the eye-facing side of the ophthalmic lens and positioned to direct light toward a corresponding one of the one or more holograms; and
   a dynamic mask positioned between the one or more light sources and the holographic film, wherein the dynamic mask spatially modulates light traveling between the one or more light sources and the one or more reflective holograms but does not spatially modulate ambient light traveling through the reflective hologram from the world-facing side of the ophthalmic lens.

12. The apparatus of claim 11, further comprising:
a first polarizer positioned between each of the one or more light sources and its corresponding hologram such that light emitted from each of the one or more light sources passes through the first polarizer; and
a second polarizer positioned between the dynamic mask and the holographic film such that light incident on the reflective hologram, light reflected by the reflective hologram, and ambient light pass through the second polarizer.

13. The apparatus of claim 11, further comprising a transparent plate positioned between the one or more light sources and the dynamic mask.

14. The apparatus of claim 13 wherein the holographic film, the one or more light sources, the transparent plate, and the dynamic mask are positioned between a pair of ophthalmic blanks.

15. The apparatus of claim 14 wherein the ophthalmic blanks of the ophthalmic lens are attached to the holographic film and the dynamic mask by optically transparent adhesive.

16. The apparatus of claim 14 wherein one or more of the ophthalmic blanks has a surface shaped to provide optical power.

17. The apparatus of claim 11 wherein the one or more light sources comprise light-emitting diodes (LEDs).

18. The apparatus of claim 17 wherein the light-emitting diodes are micro-LEDs having a transverse dimension of less than 50 microns.

19. An apparatus comprising:
an ophthalmic lens having an eye-facing side and an opposing world-facing side;
a holographic film disposed at the ophthalmic lens and having one or more reflective holograms recorded therein;
a transparent plate disposed between the holographic film and an expected position of a user's eye;
one or more light sources disposed at an eye-facing surface of the transparent plate and positioned to direct light toward a corresponding one of the one or more holograms; and
a dynamic mask positioned between the transparent plate and the holographic film, wherein the dynamic mask spatially modulates light traveling between the one or more light sources and the one or more reflective holograms but does not spatially modulate ambient light traveling through the hologram from the world-facing side of the ophthalmic lens.

20. The apparatus of claim 19, wherein the dynamic mask is a liquid crystal display (LCD).

* * * * *